(12) United States Patent
Meekins et al.

(10) Patent No.: US 10,503,963 B2
(45) Date of Patent: *Dec. 10, 2019

(54) SYSTEM AND METHOD FOR IMAGE CAPTURE AND MODELING

(71) Applicant: TAKE-TWO INTERACTIVE SOFTWARE, INC., New York, NY (US)

(72) Inventors: Timothy L. Meekins, Novato, CA (US); Emre H. Yilmaz, San Francisco, CA (US)

(73) Assignee: Take-Two Interactive Software, Inc., New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/836,578

(22) Filed: Dec. 8, 2017

(65) Prior Publication Data

US 2018/0107864 A1 Apr. 19, 2018

Related U.S. Application Data

(63) Continuation of application No. 15/089,183, filed on Apr. 1, 2016, now Pat. No. 9,855,499.

(60) Provisional application No. 62/141,732, filed on Apr. 1, 2015.

(51) Int. Cl.
| | | |
|---|---|---|
| G06K 9/00 | (2006.01) | |
| G06T 3/00 | (2006.01) | |
| A63F 13/213 | (2014.01) | |
| A63F 13/655 | (2014.01) | |
| A63F 13/25 | (2014.01) | |
| A63F 13/32 | (2014.01) | |
| A63F 13/335 | (2014.01) | |
| A63F 13/332 | (2014.01) | |
| A63F 13/327 | (2014.01) | |
| G06T 15/04 | (2011.01) | |
| A63F 13/00 | (2014.01) | |
| G06T 7/55 | (2017.01) | |
| G06K 9/62 | (2006.01) | |
| G06T 7/20 | (2017.01) | |

(52) U.S. Cl.
CPC .......... *G06K 9/00268* (2013.01); *A63F 13/00* (2013.01); *A63F 13/213* (2014.09); *A63F 13/25* (2014.09); *A63F 13/32* (2014.09); *A63F 13/327* (2014.09); *A63F 13/332* (2014.09); *A63F 13/335* (2014.09); *A63F 13/655* (2014.09); *G06K 9/00228* (2013.01); *G06K 9/00248* (2013.01); *G06K 9/00315* (2013.01); *G06K 9/6212* (2013.01); *G06T 3/0068* (2013.01); *G06T 7/20* (2013.01); *G06T 7/55* (2017.01); *G06T 15/04* (2013.01); *G06K 9/00201* (2013.01); *G06T 2207/30201* (2013.01)

(58) Field of Classification Search
CPC ...... A63F 13/655; A63F 13/00; A63F 13/327; A63F 13/213; A63F 13/25; A63F 13/32; A63F 13/332; A63F 13/33; G06T 7/55; G06T 3/0068; G06T 15/04; G06K 9/00228

See application file for complete search history.

(56) References Cited

U.S. PATENT DOCUMENTS

| | | | |
|---|---|---|---|
| 8,531,473 B2 | 9/2013 | Tzur et al. | |
| 9,855,499 B2 * | 1/2018 | Meekins | .................. G06T 15/04 |
| 2009/0202114 A1 | 8/2009 | Morin et al. | |

* cited by examiner

*Primary Examiner* — Duy M Dang
(74) *Attorney, Agent, or Firm* — Orrick, Herrington & Sutcliffe LLP

(57) ABSTRACT

A system and method for capturing a player's likeness on an in game model at runtime including geometry and texture.

19 Claims, 10 Drawing Sheets

400

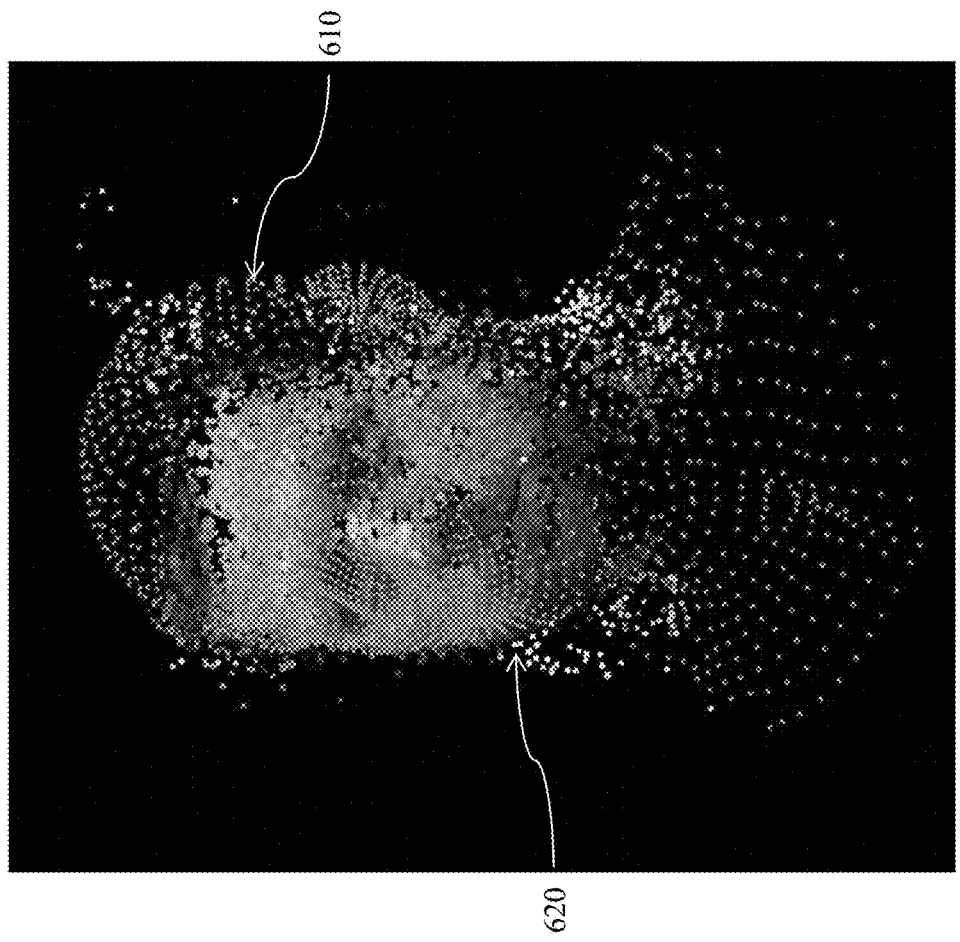

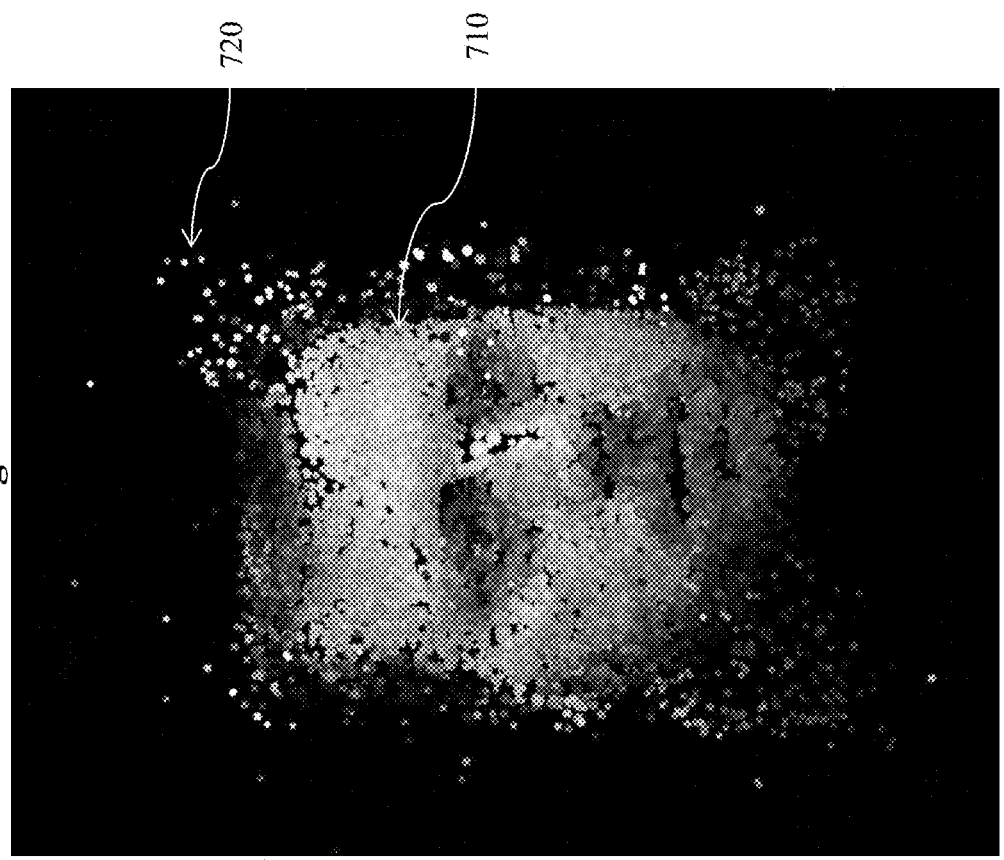

800

SYSTEM AND METHOD FOR IMAGE CAPTURE AND MODELING

CROSS-REFERENCE TO RELATED APPLICATIONS

This application is a continuation of U.S. patent application Ser. No. 15/089,183, which was filed Apr. 1, 2016, issued as U.S. Pat. No. 9,855,499, and claimed priority to Provisional Patent Application No. 62/141,732, which was filed Apr. 1, 2015, and Provisional Patent Application No. 62/182,355, which was filed Jun. 19, 2015. The disclosures of these Applications are herein incorporated by reference in their entirety and for all purposes.

FIELD

The present disclosure relates generally to image capturing and modeling systems and more specifically, but not exclusively, to video game systems and methods for capturing the likeness of a video game player on an in-game model at runtime of the video game system.

BACKGROUND

Conventional video game systems are equipped with enhanced graphics capabilities to create very realistic visuals during gameplay. For example, highly detailed facial expressions, accurate physics, smooth graphics processing, and so on, have dramatically improved the quality of video game graphics in recent years. The result is a life-like quality to the action and movement in video games, bridging the gap between a virtual world and a physical reality.

Additionally, some video game systems provide users (or video game players) with a natural user interface (NUI) that provides users the ability to interact naturally with the video game system. Some examples include video game systems that are equipped with image capturing devices (e.g., cameras, motion controllers, etc.), such as the Microsoft Xbox Kinect®, the Nintendo Wii®, the Sony PlayStation 3®/PlayStation 4®. Users can control and interact with these video game systems through gestures and spoken commands without the need for a separate video game controller to provide an even further connection between the real and virtual worlds.

Some video game systems not only give users a feeling that they are immersed into the virtual game, but also allow the users to create personal avatars for use in the game. Avatars are graphical representations of the user or the user's alter ego or character. In some games, the player's representation is fixed; however, many games offer a basic character model (or template) and allow customization of the physical features as the players sees fit. Typically, video game systems provide the user with an option to select from a predetermined set of characteristics that can be modified and saved as a personalized character. For example, a template avatar can be modified with a variety of clothing, facial hair, hair color, face shape, body size, height, and so on. In addition to selecting predetermined characteristics, some video game systems (e.g., with the image capturing devices) allow users to take their own picture to create their avatar.

However, these conventional game systems have used tricks such as placing one or two captured/uploaded photographs onto a fixed model or hand placing markers on one or two photographs. In recent years, photogrammetry tools have been developed to create highly detailed models (e.g., three-dimensional models) from a sequence of photographs. These tools use high resolution professional camera systems and fully calibrated lighting systems—systems that are very costly for personal use. Even further, the process for creating the detailed three-dimensional models is prone to error. Several cameras typically are used to take numerous photographs simultaneously and can introduce artifacts and non-uniform sampling without perfect alignment and equal lighting. Other factors including illumination, texturing, and facial recognition also pose challenges for creating highly detailed models. In conventional systems, the resulting models also go through several passes of manual tuning by professional artists.

In view of the foregoing, a need exists for an improved system and method for capturing a user's likeness in an effort to overcome the aforementioned obstacles and deficiencies of conventional image capturing and modeling systems.

SUMMARY

One aspect includes a method of capturing a user's likeness on an in game model at runtime that includes acquiring, by an input device coupled to a data processor, a set of images of the user; isolating one or more features from the acquired set of images to be matched, wherein a selected feature represents a group of pixels that can be found across at least one of the set of acquired images; matching a selected feature to said one or more isolated features; triangulating points of the acquired set of images in a three-dimensional space based on said matched features; aligning the triangulated points to a target model; and generating texture for use on the aligned points to generate the in game model at runtime.

In a further embodiment, the method also includes compressing the generated texture; and uploading the compressed texture to a game server in communication with the data processor.

In another embodiment, the method also includes solving for a set of morph shapes on the target model based at least in part on said acquired set of images.

In one embodiment, the isolating one or more features includes limiting an area of each acquired set of images to a face tracking rectangle.

In yet another embodiment, the method also includes eliminating said matched features that are outliers via a parameter estimation.

In one embodiment, triangulating points further comprises a minimization selected from at least one of a bundle adjustment and a damped least-squares.

In another embodiment, aligning the triangulated points further comprises at least one of rotating, scaling, translating, transforming, and sweeping the triangulated points to the target model.

In some embodiments, generating texture further comprises blending said generated texture onto a preset head texture.

In yet another embodiment, isolating one or more features comprises defining features based on at least one of a Scale Invariant Feature Transform, a Speeded Up Robust Features, a Binary Robust Invariant Scalable Keypoints, a Fast Retina Keypoint, an Accelerated KAZE, a Gradient Location and Orientation Histogram, and a Histogram of Oriented Gradients.

In another embodiment, acquiring the set of images comprises acquiring at least fifteen images of the user between negative thirty-five degrees and positive thirty-five degrees from center.

Another aspect includes a system for capturing a user's likeness on an in game model at runtime that includes an input device coupled to a data processor, said input device for acquiring a set of images of the user; and a platform being coupled to said data processor that executes a set of instructions stored on a non-transitory computer readable medium on the platform and executable by the data processor to cause the data processor to perform operations comprising isolating one or more features from the acquired set of images to be matched, wherein a selected feature represents a group of pixels that can be found across at least one of the set of acquired images; matching a selected feature to said one or more isolated features; triangulating points of the acquired set of images in a three-dimensional space based on said matched features; aligning the triangulated points to a target model; generating texture for use on the aligned points to generate the in game model at runtime; and post-processing the aligned points on the in game model.

In some embodiments, the set of instructions further include instructions for compressing the generated texture and uploading the compressed texture to a game server in communication with the data processor.

In another embodiment, the set of instructions further include instructions for solving for a set of morph shapes on the target model based at least in part on said acquired set of images.

In some embodiments, the platform is at least one of a dedicated game console, a biometrics system, a motion picture system, a medical application system, and a multimedia platform.

In another embodiment, the set of instructions further include instructions for eliminating said matched features that are outliers via a parameter estimation.

In one embodiment, triangulating points further comprises a minimization selected from at least one of a bundle adjustment and a damped least-squares.

In another embodiment, aligning the triangulated points further comprises at least one of rotating, scaling, translating, transforming, and sweeping the triangulated points to the target model.

In some embodiments, generating texture further comprises blending said generated texture onto a preset head texture.

In yet another embodiment, isolating one or more features comprises defining features based on at least one of a Scale Invariant Feature Transform, a Speeded Up Robust Features, a Binary Robust Invariant Scalable Keypoints, a Fast Retina Keypoint, an Accelerated KAZE, a Gradient Location and Orientation Histogram, and a Histogram of Oriented Gradients.

In one embodiment, acquiring the set of images comprises acquiring at least fifteen images of the user between negative thirty-five degrees and positive thirty-five degrees from center.

BRIEF DESCRIPTION OF THE DRAWINGS

FIG. 6 is an exemplary screenshot illustrating an embodiment of an average head during the alignment process of FIG. 2.

FIG. 7B is an exemplary screen illustrating another view of an embodiment of the average head during the background sweep process of FIG. 2.

Figure 1:
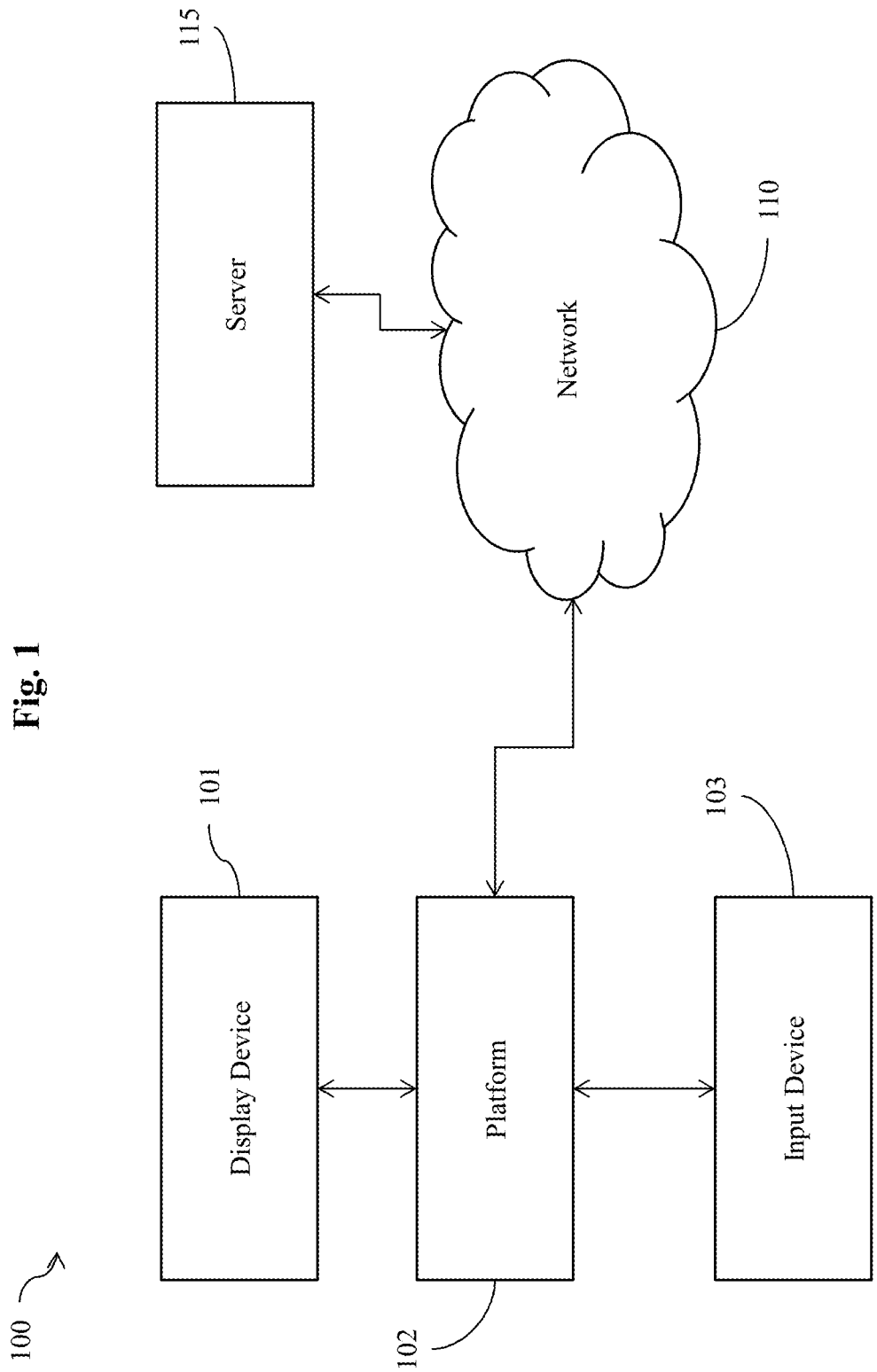
FIG. 1 is an exemplary top-level block diagram illustrating an embodiment of an image capturing system having a platform, a display device, and an input device.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

As previously discussed, currently-available image capturing and modeling systems are deficient because they rely on user interaction and professional image capturing equipment. Accordingly, an image capturing and modeling system that captures a player's (or user's) likeness at runtime using simple image capturing devices and minimal user interaction can prove desirable and provide a basis for a wide range of modeling applications, such as for use in biometrics, motion pictures, video games, and medical applications. This result can be achieved, according to one embodiment disclosed herein, by an image capturing and modeling system 100 as illustrated in FIG. 1.

Turning to FIG. 1, the image capturing and modeling system 100 can include any number of platforms 102 in communication with an input device 103. For example, the platform 102 can represent any biometrics, motion picture, video game, medical application, or multimedia platform as desired. According to one embodiment disclosed herein, the platform 102 is a gaming platform for running game software and various components in signal communication with the gaming platform 102, such as a dedicated game console including an XBOX One® manufactured by Microsoft Corp., PLAYSTATION 4® manufactured by Sony Corporation, and/or WII U® manufactured by Nintendo Corp. In other embodiments, the platform 102 can also be a personal computer, laptop, tablet computer, or a handheld mobile device. One or more players can use a gaming platform to participate in a game. Multiple gaming platforms may be linked together locally (e.g., via a LAN connection), or via a network 110 (e.g., the Internet or other communication networks).

The network 110 can also include any number of wired data networks and/or any conventional wireless communication network, for example, radio, Wireless Fidelity (Wi-Fi), cellular, satellite, and broadcasting networks. Exemplary suitable wireless communication technologies used with the network 110 include, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In one embodiment, the platform 102 can be connected via the network 110 to a server 115 that can host, for example, multiplayer games and multimedia information (e.g., scores, rankings, tournaments, and so on). Users can access the server 115 when the platform 102 is online via the network 110. Reference herein to the platform 102 can include gaming platforms executing video game software or game software (e.g., computer program products, tangibly embodied in a computer-readable storage medium). Additionally and/or alternatively, references to the platform 102 can also include hardware only, or a combination of hardware and/or software. In some embodiments, the platform 102 includes hardware and/or software, such as a central processing unit, one or more audio processors, one or more graphics processors, and one or more storage devices.

The platform 102 typically is electrically coupled to a display device 101. For example, the display device 101 can be an output device for presentation of information from the platform 102 and includes a television, a computer monitor, a head-mounted display, a broadcast reference monitor, a medical monitor, the screen on a tablet or mobile device, and so on. In some embodiments, the platform 102 and/or the display device 101 is in communication with an audio system (not shown) for presenting audible information.

In FIG. 1, the platform 102 also is electrically or wirelessly coupled to one or more controllers or input devices, such as an input device 103. In some embodiments, the input device 103 is a game controller and includes keyboards, mice, gamepads, joysticks, directional pads, analog sticks, touch screens, and special purpose devices (e.g., steering wheels for driving games and/or light guns for shooting games). Additionally and/or alternatively, the input device 103 includes an interactive-motion-tracking system, such the Microsoft Xbox One KINECT® device or the Sony PlayStation 4 Camera®, for tracking the movements of a player within a 3-dimensional physical space. The input device 103 provides data signals to the platform 102, which processes the data and translates the player's movements on the display device 101. The platform 102 can also perform various calculations or operations on inputs received by the sensor and instruct the display to provide a visual representation of the inputs received as well as effects resulting from subsequent operations and calculations.

Such motion sensing input devices typically include one or more image capturing cameras. For example, the Sony PlayStation 4 Camera® includes two 1280×800 pixel cameras with lenses having an aperture of f/2.0, with a 30 cm focusing distance, and an eighty-five degree (85°) field of view.

Figure 2:
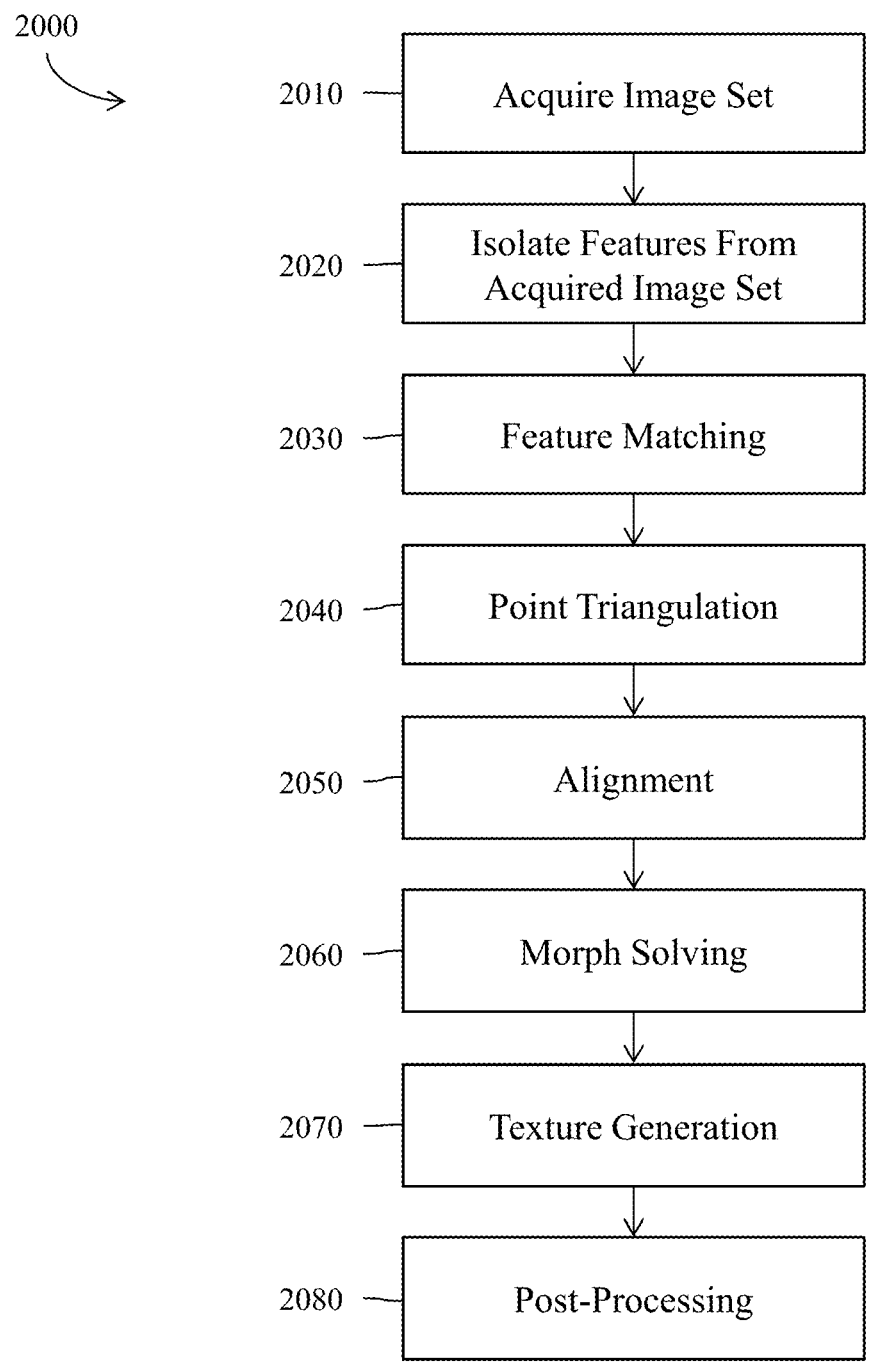
FIG. 2 is an exemplary flow diagram illustrating one embodiment of a process for capturing a player's likeness using the image capturing system of FIG. 1.

As discussed above, some video game systems allow the users to create personal avatars for use in the game for a more realistic feel during gameplay. However, currently-available image capturing and modeling systems are deficient because they rely on user interaction and professional image capturing equipment. Turning to FIG. 2, a process 2000 for capturing a three-dimensional user's likeness during gameplay with minimal user interaction, using simple equipment—such as the input device 103 and the system 100—is shown.

Figure 3:
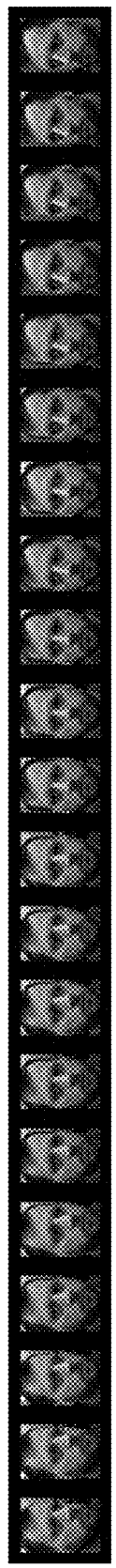
FIG. 3 is an exemplary screenshot illustrating an embodiment of the image acquisition of FIG. 2.

The first step in process 2000 is to acquire a set of images for analysis (action block 2010). For example, in some video games, the user can take their own picture via the input device 103 to begin creating a personalized avatar. In some embodiments, these captured images represent the user's face from a predetermined set of unique angles sufficient to recreate the user's head in 3 dimensions. Stated in another way, the predetermined set of unique angles provides sufficient data to triangulate enough points for solving a good face morph (discussed below). The predetermined set of unique angles can include any suitable number and preferably comprises at least 15 images between negative thirty-five degrees (−35°) and positive thirty-five degrees (35°) from center. This result can be achieved, for example, by having the user simply turn their head from left to right in front of the input device 103. An example set 300 is shown in FIG. 3. Advantageously, the captured images do not require the entire head shape of the user and can, instead, be based mostly on the user's face.

In some embodiments, the number of images of the predetermined set of unique angles depends on the distance that the user is from the input device 103. Other factors affecting the number of images required is also the face detection process used (discussed below). For example, the suitable number of images can vary from 20 to 70 images between negative thirty-five degrees (−35°) and positive thirty-five degrees (35°) from center.

In some embodiments, the platform 102 is configured to receive the captured images from the input device 103 and isolate the face from the background. For example, the platform 102 can receive the entire set of captured images as input in order to search for features within a face tracking rectangle. The face tracking rectangle provides a defined area for the platform 102 to limit any facial recognition, advantageously limiting the noise outside of the tracked area. Similarly, the facial tracking rectangle can also provide an angle to predict the angle of the user head from center. If more than one face is recognized, the face closest to the input device 103 is used.

The platform 102 determines the position of the head on the projection plane (image sensor) of the input device 103 to provide image sensor coordinates. The optics and distortion of an image typically are centered on the image. Maintaining the position of the head on the projection plane without cropping beneficially preserves this center projection point to triangulate the points in three-dimensional space.

To isolate the face region in an image and to capture enough images spread across all angles, real-time face recognition and tracking can be used. In addition to tracking, face recognition has the benefit of restricting the captured images to faces, thereby disallowing the user from scanning anything other than a human face. Software libraries for face tracking are available in the art and an appropriate system can be employed depending on the type of input device 103. For example, an infrared camera builds a rough (lower resolution than the color sensor) three-dimensional depth field. The platform 102 can then extract the skeleton of any person in view. From this skeleton, a specific player can be identified to track such that standard face tracking libraries can be used to return an enclosing rectangle and an orientation quaternion.

In another example, a library which processes an entire image and returns a list of all recognized faces including their bounding rectangles and Euler orientations can be used. The software library that is used depends on a number of factors including the distance between the user and the input device 103, focal lengths, data density, resolution textures, camera quality of the input device 103, white balancing, brightness balancing, exposure, and so on.

In some embodiments, the platform 102 allows the user to change their player's skin tone post capture, correcting for any lighting errors.

Figure 4:
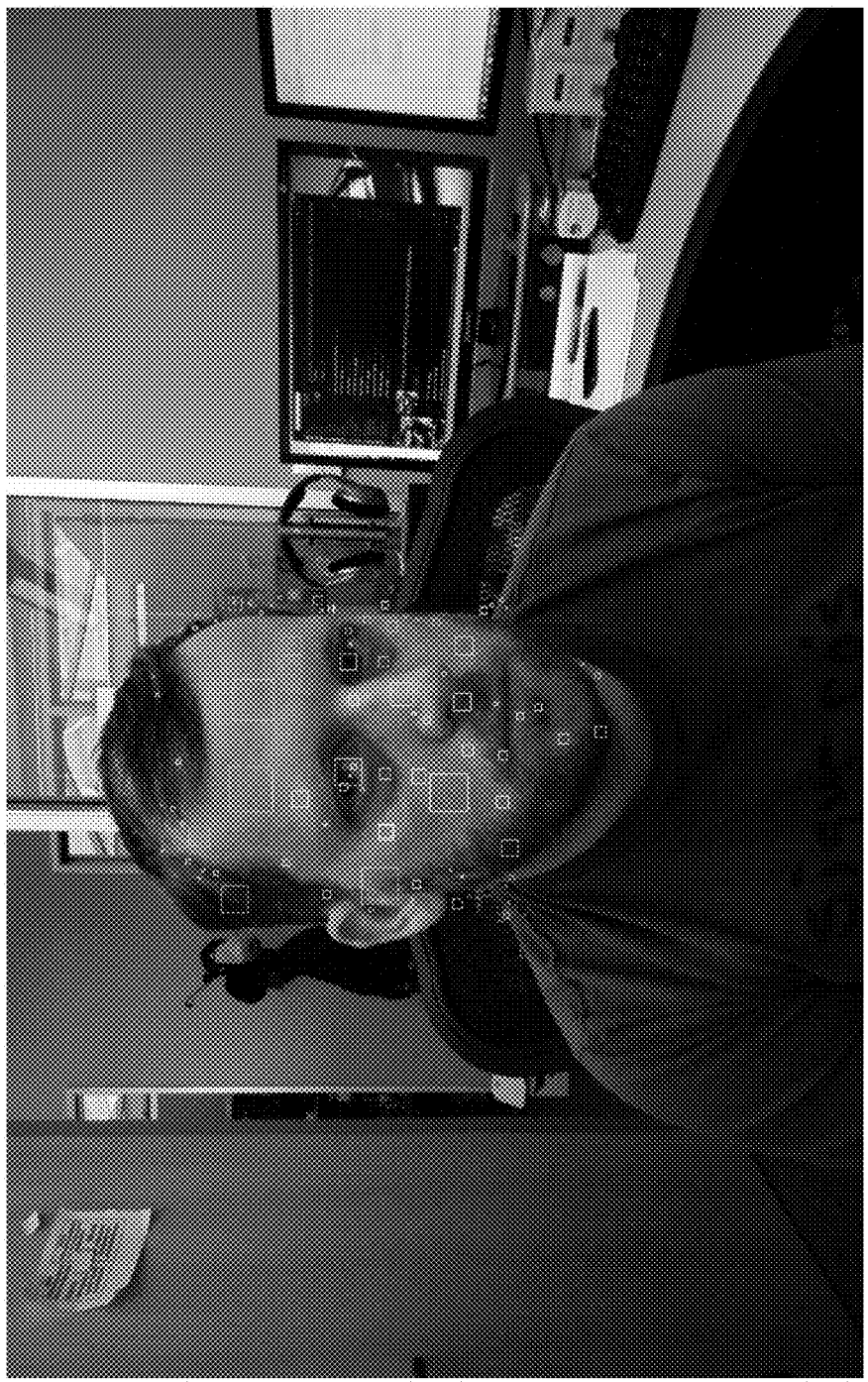
FIG. 4 is an exemplary screenshot illustrating an embodiment of the feature detection of FIG. 2.

Once the set of captured images (from action block 2010) are provided to the platform 102 via the input device 103, the platform 102 finds features on each captured image (action block 2020) that can later be matched to one another (discussed below as action block 2030). A feature can include any group of unique pixels that can be consistently found on every image. For example, a screenshot 400 shown in FIG. 4 illustrates a human face having a number of various features that have been detected. If different features are found on each image, these features cannot be matched between images to triangulate their three-dimensional position. In some embodiments, the features are invariant over scale, rotation, exposure, noise, and affine transformation (perspective).

Any suitable feature detection method can be used, such as David Lowe's Scale-Invariant Feature Transform (SIFT), Speeded Up Robust Features (SURF), Binary Robust Invariant Scalable Keypoints (BRISK), Fast Retina Keypoint (FREAK), Accelerated KAZE (AKAZE), Gradient Location and Orientation Histogram (GLOH), Histogram of Oriented Gradients (HOG), and so on. For example, SIFT defines feature descriptions to robustly identify objects even among clutter and partial occlusion.

SIFT examines an image at multiple octaves, and at multiple Gaussian blurs per octave. For human faces, 2 or 3 octaves are sufficient because SIFT is invariant to uniform scaling, orientation, and partially invariant to affine distortion and illumination changes. In some embodiments, increasing the levels of Gaussian blur at each octave, for example, from three up to six or seven, results in a significant increase in the number of features found. Rotation can be handled by finding the eigenvectors around each feature.

In some embodiments, feature detection 2020 accounts for contrast and brightness. Bright lighting conditions and a high contrast images produce a significantly denser feature set (producing a denser point cloud for the later stages). Furthermore, the feature detection can process multiple images simultaneously on multiple hardware threads.

Returning to FIG. 2, once the platform 102 identifies a set of features for each image, each of the k features is matched to the n−1 other images (action block 2030). In some embodiments, for each image pair used in action block 2020, feature matching includes iteratively identifying a predetermined number (e.g., two) of detected features from a second image that are the most similar to a selected detected feature from a first image. Once matched, corresponding points on multiple images can be used to triangulate their three-dimensional position. However, if capturing 65-70 images, which may provide about 2,100 features per image, the number of comparisons quickly adds up and can include up to 65×65×2100×2100 ($18.6×10^9$) compares. Each compare is a 256-dimension Euclidean distance: $\sqrt{(a_1-b_1)^2+...+(a_n-b_n)^2}$. This is $O(n^5)$ algorithm complexity.

Proper feature matching also requires finding the k nearest neighbors (k is 2, for example). Finding nearest neighbors further complicates the search. Typically, a KD search tree can be used, but the high dimensionality (e.g., 256 dimensions) renders a KD search tree no better than a brute force search.

Accordingly, in some advantageous embodiments, an approximate nearest neighbor search can be used, such as a modified KD tree to reduce the data set. The approximate nearest neighbor search correctly matches a large percentage of the found features. However, for the purpose of recognizing objects, only a small reasonable percentage of the features need to be matched for high confidence. Each feature is potentially a three-dimensional triangulated point, and matching more features provides a higher quality model.

In some embodiments, converting Euclidean distance on the feature descriptors, with some loop unrolling, data level parallelism (e.g., single instruction, multiple data), and distance-based limits can result in a speed increase of about six hundred percent. For example, images separated by a large distance (e.g., head's yaw angle, for example) would have zero to few matches and can be skipped. For example, performing feature matches between images that are separated by less than twenty degrees (20°) reduces outliers and increases the comparison speed up to three hundred percent. Accordingly, in some embodiments, features on the left profile of a user head are not matched with features on the right profile of the user head.

In some embodiments, if the distance of the most similar feature match is less than a predetermined percentage (e.g., seventy-five percent) of the distance of the second most similar feature, both images can be used as matches between two selected images. The feature matching process can be repeated over every pair of images where there is a feature match.

For each image pair, a Fundamental Matrix ("F") can be calculated that will project a first image onto the second image. The Fundamental Matrix relates corresponding points in stereo images. Additional information regarding Fundamental Matrices can be found, for example, in Richard Hartley and Andrew Zisserman (2003), *Multiple View Geometry in Computer Vision*, Cambridge University Press, which is hereby incorporated by reference in its entirety and for all purposes. Using the F matrix, each feature on the first image can be projected onto the second image and the distance from the matching feature on the second image can be calculated. For each feature, if the distance (e.g., projection error) is more than a maximum distance (e.g., one pixel away), this feature can be classified as an outlier and ignored.

Feature matching advantageously eliminates noise and other images not to be processed. For example, a second person walking into view of the input device 103 during the image capture process 2010 can introduce a second face to the platform 102 in several images. Due to feature matching and multiple passes of outlier detection, none of the images from the second face—which cannot be matched—will be used. For example, if one or two images are from the second face, then the features from the one or two images of the second face will not match any other image and will not be used.

After generating pairs of feature matches, process 2000 subsequently triangulates matched features into three-dimensional points (action block 2040). Three-dimensional point triangulation can also be referenced as "structure from motion" and can be used to project an unknown three-dimensional object onto each sample image. Accordingly, given the set of images used in the feature matching discussed above, each image contains points associated with an unknown three-dimensional position. Each point can be associated with a set of matched features (discussed above) for solving the unknown three-dimensional positions using linear algebra, for example. Point triangulation can include finding two images with the largest number of matches, but are not very similar (e.g., at least two degrees or more of separation). In one embodiment, the platform 102 finds the Fundamental Matrix F for camera pairs (the homography) by estimating parameters, for example, using a Random Sample Consensus (RANSAC) method to eliminate outlying feature matches.

The platform 102 then solves for the camera extrinsics for each captured image to triangulate the points. Since the data is non-linear, a minimization algorithm can be used to solve the linear algebra matrix in the example above. For point triangulation, for example, the minimization algorithm is referred to as "bundle adjustment," which includes any method for making a point project to a set of features (or bundles). Given a set of measured image feature locations and correspondences, the goal of bundle adjustment is to find three-dimensional point positions and camera parameters that minimize reprojection error. This optimization problem is usually formulated as a non-linear least squares problem, where the error is the squared norm of the difference between the observed feature location and the projection of the corresponding 3D point on the image plane of the camera (the input device 103). One example of bundle adjustment is the Ceres solver from Google®. Other examples of minimization include damped least-squares. The point triangulation can be repeated until all of the input devices 103 and matches have been solved, resulting in a point cloud (discussed below with reference to action block 2050) of triangulated points and camera matrices for each image.

Figure 5:
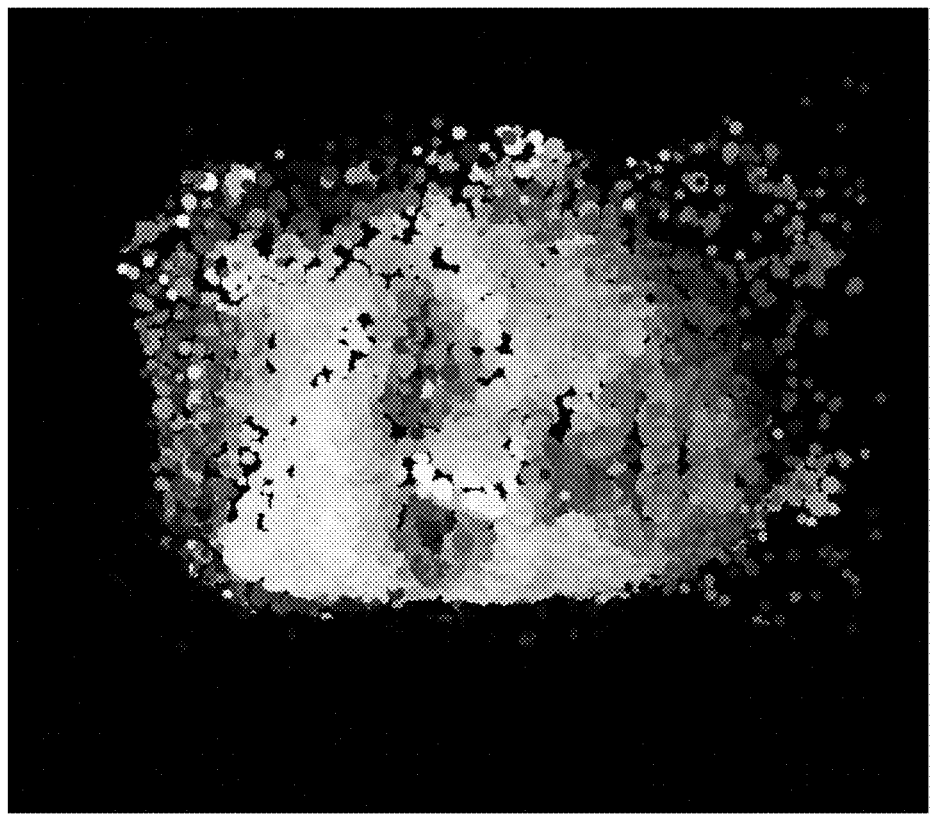
FIG. 5 is an exemplary screenshot illustrating an embodiment of the point triangulation of FIG. 2.

Additional information regarding point triangulation is discussed in "Multiple View Geometry" by Hartley & Zisserman, which is herein incorporated by reference in its entirety and for all purposes. An exemplary result of the point triangulation method is shown in a screenshot 500 in FIG. 5.

Returning to FIG. 2, the process 2000 continues with an alignment (action block 2050) of the set of triangulated points to a target head model. In some embodiments, the target head model is a set of three-dimensional points of an "average" head. An exemplary average head 600 is shown in FIG. 6. In FIG. 6, the model points 610 are included in the average head 600 that are to be matched. The calculated points 620 represent the triangulated points determined in the steps above. In the alignment (action block 2050) process, the calculated points 620 are rotated, scaled, translated, and/or transformed to align with the model points 610. FIG. 6 illustrates the average head 600 following a coarse alignment process.

Figure 7A:
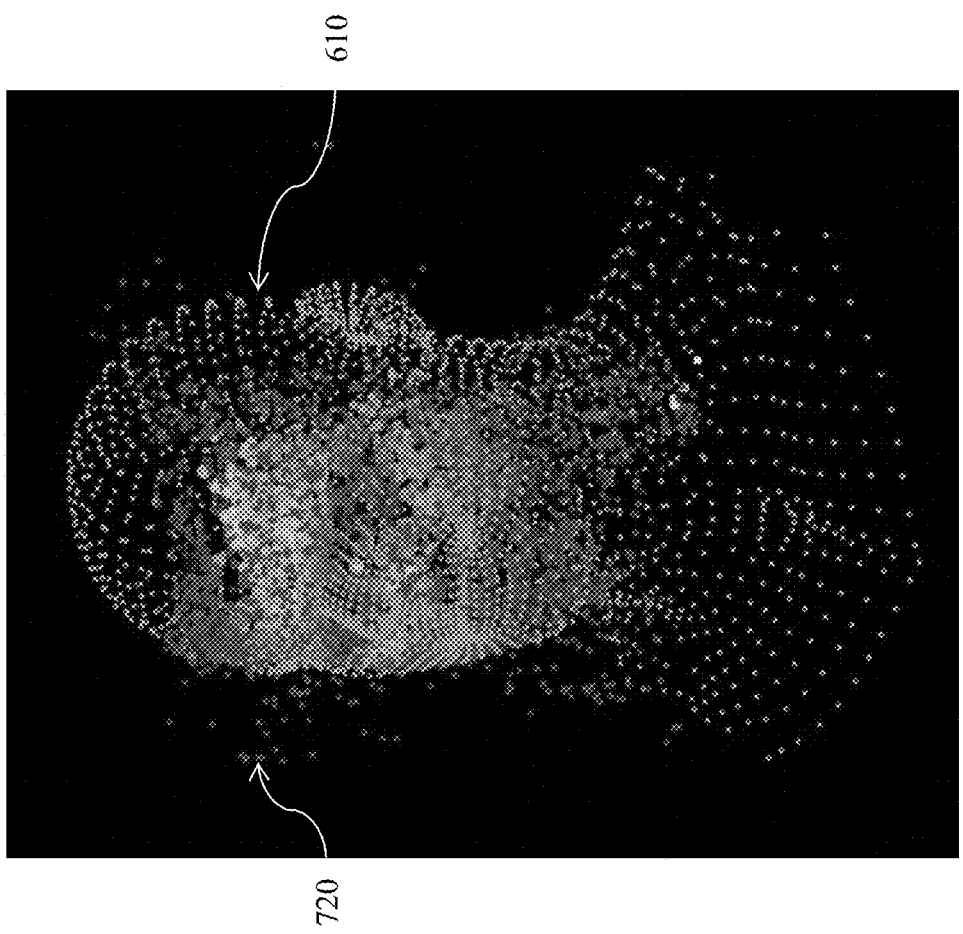
FIG. 7A is an exemplary screen illustrating an embodiment of an average head during a background sweep process of FIG. 2.

The set of triangulated points can be noisy. This is especially true from images of cropped heads. For example, around the shoulder and head, bits of the background can be visible. Specifically, as discussed above, the set of captured images (from action block 2010) from the input device 103 is based on a rotation of the user's head in front of a stationary camera (e.g., the input device 103). When provided to the platform 102, the set of captured images provide the illusion that the input device 103 physically moved around the user's head. Similarly, a static background object that appears in any of the captured images will also appear to be moving. Accordingly, the platform 102 filters (or "sweeps") these outlier background objects to provide for better alignment. An exemplary sweeping model 700 is shown in FIGS. 7A-B. Turning to FIG. 7A, any visible background appears to be a swept object 720. This also can be seen in FIG. 7B.

In one embodiment, the platform 102 locates the centroid of the points and finds the average distance from the centroid. Any point more than a predetermined outlier range (e.g., 1-2σ—one to two standard deviations) away from the average radius is marked as an outlier. In some embodiments, the predetermined outlier range of 1.5σ—one and a half standard deviations has proved particularly advantageous.

In some embodiments, before any robust alignment is performed, the platform 102 can perform a coarse alignment to determine the point cloud roughly aligned to our target head. For example, the coarse alignment can be based only on scale, position, and orientation. Therefore, the coarse alignment can fit a sphere (e.g., the shape of the head) to a set of points. Given an equation for a sphere, $$x^2+y^2+z^2+ax+by+cz+d=0$$

$$ax+by+cz+d=-(x^2+y^2+z^2)$$

$$Ax=b$$

From this system of equations, a least squares solution results in a best fit sphere of radius $$\sqrt{\frac{a^2+b^2+c^2}{4}-d}$$

and centered at $$\left(-\frac{a}{2},-\frac{b}{2},-\frac{c}{2}\right).$$

This positioning and scale is about 90% to 95% accurate if outlier noise is removed. The same sphere fitting can be used to scale and translate the point cloud to match the target model's scale and position.

Following the coarse alignment, a proper alignment can minimize the difference between two clouds of points. For example, an Iterative Closest Point (ICP) process fine tunes the point translation and determines a rotation. Stated in another way, the platform 102 aligns the triangulated points and the target points about a common centroid. A cross product between the two sets of "matching" points results in a 3×3 matrix that is broken down with a Singular Value Decomposition. For example, the 3×3 matrix can be decomposed into three separate matrices U, S, and V. The U and V matrices can be multiplied, ignoring the S matrix, and a resulting rotation matrix can be used to move the point cloud towards the target points. This resulting matrix can be applied to all points to be rotated. Since the coarse alignment in the previous step did 90% of the alignment, it is extremely unlikely for the ICP to fall into local minima. For example, as shown in FIG. 6, the resulting image after a coarse alignment only requires the ICP to rotate the remaining calculated points 620 into place. This rotation can be applied until the points are no longer able to rotate.

In some embodiments, a non-linear minimization solver is used to minimize the squared distance between two points and the closest matching points on the target. For example, a Broyden-Fletcher-Goldfarb-Shanno (BFGS) process solves for a translation and scale. The BFGS is a gradient descent solution that adjusts a scaling factor to minimize the distance between the two points and the closest matching points on the target. In this example, the BFGS (gradient descent minimization solver) finds a global scale to minimize the distance between the point cloud and the target head. In some embodiments, the ICP and BFGS process can be repeated any number of times as desired.

Once the point cloud has been aligned to the target model, the platform 102 solves for a set of morph shapes (action block 2060) on the target head that most closely matches the point cloud. A morph shape is a similar shape to the base model that can be morphed, or blended, into. Having multiple morphs blended together allows any head shape to be created. This will not only produce geometry matching the scanned face, but also provide a close match so that the scanned images can be accurately projected onto the target's texture map. Thus, a more realistic model is created. A slight error in the morphs can produce a texture misalignment on the final model. However, the texture misalignment can be minimized, for example, using a histogram of images that can be projected onto the target head and post-processing discussed below.

Principal Component Analysis (PCA) results in as many morph shapes (which are represented by eigenvectors) as there are input heads and sorts them in order of importance. Just like the scale solver in process 2050, the BFGS can be used to minimize the distance between the shapes and thereby reduce the error In some embodiments, the PCA morphs are augmented to also include color data to further reduce any error. For example, the Euclidean distance can also consider the "color distance." This can assist in matching facial structures that are correlated by skin color. For example, the PCA morphs can differentiate lips, skin, and eyes using their different colors. The color and vertex positions were weighted to have equal value so that an error metric score wouldn't be skewed.

Furthermore, scaling the luminance of the point cloud colors such that the mean luminance matched that of the target model accommodates for facial scans taken in much darker lighting conditions. This is advantageous because gaming systems are often kept indoors in places that are not optimally lit, such as living rooms or bedrooms.

In some embodiments, a penalty function was added when the edge vertices of the face moved too far from the head. Stated in another way, the penalty function acts as a penalty score to minimize the distance from the three-dimensional points and the target head's face.

Because of the nature of the cameras and auto-exposure algorithms of the input device 103, each image can be captured with slightly different exposures. To reduce issues with stitching differently exposed images together, the mean luminance can be calculated for each image. A scaling factor is produced for each image so all images can all have equal luminance. A typical scan uses scaling factors between 0.95 and 1.05. Much larger scales can be seen when the auto-exposure changed mid-scan.

Process 2000 continues with a texture generation (action block 2070). In one embodiment, the target model has a set of UV coordinates to indicate where in the texture to render to, and the point triangulation included solving for the camera matrix. The camera matrix allows the platform 102 to project any point in three-dimensional space onto the matching pixel of any of the captured images.

Accordingly, the platform 102 loops over all the polygons on the target model (e.g., average head 600 shown in FIG. 6) (with morphs applied) and uses the camera matrix to project the polygon onto the source image. This projection is the UV coordinates for rendering this source image onto the polygon. The target of this polygon is the texture to be generated and the coordinates drawn to are the UV coordinates of the polygon on the target head. Stated in another way, the UV coordinates and the vertex coordinates are swapped.

To confirm that no edges are visible between polygons from selecting different image sources, a vertex-centric view can be used. For example, a histogram of images can be created for each vertex. The platform 102 looks through the histogram of images contributing to each vertex of the polygon and calculates the vertex weighting of the image at each vertex. If any of the 4 vertex weights for an input image is non-zero, that image is rendered by the platform 102 onto that polygon projection. The platform 102 adds the final color to the target, so the total contributions add up to a final weight of 1.0 at each pixel. For accuracy and final gamma correction, the rendering can be done in a floating point render target. After rendering, the floating point texture can be copied to an ARGB texture with gamma correction (which should lose little information since the source was floating point).

Figure 8:
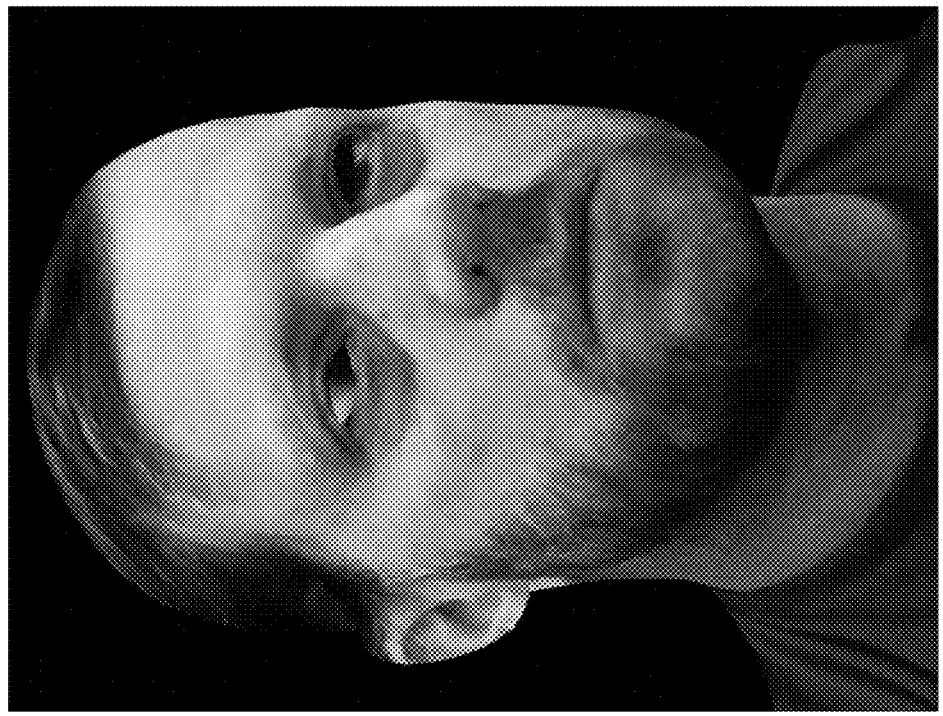
FIG. 8 is an exemplary screenshot illustrating an embodiment of the texture generation of FIG. 2.

For each polygon, the platform 102 projects the polygon onto all of the captured source images. If the projection was within the texture (and inside the tracking window), the platform 102 performs a cross product of two adjacent sides of the polygon. The length of the cross product is the area of the polygon projected on to the image. The platform 102 chooses the image with the largest projected area for this polygon and updates the 4 vertex histograms to contain this image. The image with the largest area was most likely the camera of the input device 103 with the most straight-on projection or the camera that was closest. This results in the highest resolution being used at each polygon and the least amount of affine distortion. An exemplary result of the texture generation is shown in model 800 shown in FIG. 8.

In the process 2000 described above, the platform 102 is concerned entirely on the face region, not the head as a whole. Therefore, a texture is accurately generated for the front of the face. To create the final head texture, the platform 102 blends the generated face texture into a preset head texture (action block 2080). A hand drawn alpha mask maintains the important parts of the generated face when it is blended onto the preset texture. For example, a grayscale blending texture can be used as the alpha mask to designate predetermined areas of the face that use the generated face texture (e.g., white areas of the alpha mask), the preset texture (e.g., darker areas of the alpha mask), or a blend of the generated and preset textures (e.g., gray areas).

Furthermore, performing a tone mapping operation on the generated texture blends to the preset texture (including the entire body) as to not show any color seams. This advantageously accounts for captured skin tones producing in a wide continuous range different than a preset head textures in fewer tones.

For example, the platform 102 samples the face in multiple locations to get an average RGB color. The platform 102 can also sample the preset texture and get an average RGB color for it. Scaling the generated texture by the ratio of the two RGB averages (independently for R, G, and B) maps the generated face texture to the same tone as the preset head texture. For further refinements, a user interface can be provided to allow the player to cycle through skin tones after the scan is completed and select a specific skin tone.

Additionally, the platform 102 can sample the average skin tone (described above) independently on the left and right side of the face, resulting in a bilateral tone map. The tone mapping scale is linearly interpolated across the face when applied. Similar sampling can extend this to the top and bottom of the face, resulting in a quadrant-based approach (4 tone map scales bi-linearly interpolated). This advantageously reduces the effects of uneven lighting.

Finally, one or more filters can be applied to clean-up the area around the eye. For example, each pixel around the area surrounding the eye can be used to adjust surround pixels. Accordingly, the pixels around the eye match the texture, lighting, transparency, and shading of the sampled pixels from the surrounding area to provide a seamless blend to the rest of the image. This can correct for mis-aligned textures and reduce eye-shadowing. The amount to move each pixel can be embodied in a separate texture of movement vectors.

Figure 9:
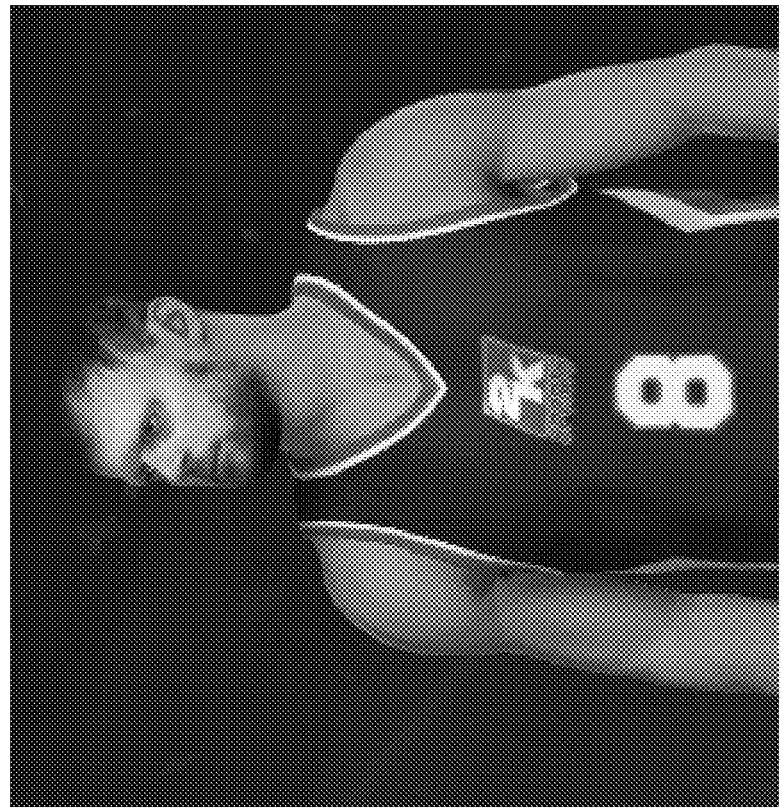
FIG. 9 is an exemplary screenshot illustrating an embodiment of the result of post-processing of FIG. 2.

Once any post-processing clean-up is complete, the texture is then compressed and can be uploaded to the server 115 such that the textures can be applied to the above captured geometry and displayed in a game, such as shown on an exemplary character 900 in FIG. 9. Alternatively, this could be done locally on the game system.

Although the process 2000 for capturing a three-dimensional user's likeness is described above using equipment—such as the input device 103 and the system 100, each step of the process 2000 can be performed and/or executed on different hardware. For example, the acquisition of the image set step 2010 could be on a mobile device, the feature matching step 2030, the point triangulation step 2040, the morph solving step 2060, and texture generation step 2070 can be performed on the server 115, and the post processing step 2080 and viewing can be performed on a game console (e.g., the platform 102, the display device 101). Additionally and/or alternatively, every step of the process 2000 can be performed and/or executed on the game console only.

It should be understood that there exist implementations of other variations and modifications of the invention and its various aspects, as may be readily apparent to those of ordinary skill in the art, and that the invention is not limited by specific embodiments described herein. Features and embodiments described above may be combined in various ways. The present invention is therefore contemplated to cover any and all modifications, variations, combinations or equivalents that fall within the scope of the basic underlying principals disclosed and claimed herein.

It will be appreciated that all of the disclosed methods, and procedures described herein can be implemented using one or more computer programs or components. These components may be provided as a series of computer instructions on any conventional computer-readable medium, including RAM, ROM, flash memory, magnetic or optical disks, optical memory, or other storage media. The instructions may be configured to be executed by a processor which, when executing the series of computer instructions, performs or facilitates the performance of all or part of the disclosed methods, and procedures.

What is claimed is:

1. A computer-implemented method for capturing a user's likeness on an in game model at runtime based on a set of images of the user, comprising:
    isolating one or more features from the set of images to be matched, wherein each feature represents a group of pixels that can be found across at least one of the set of images;
    matching a selected feature to said one or more isolated features;
    generating a Fundamental Matrix for each image pair in the acquired set of images based on said matched features;
    triangulating points of the set of images in a three-dimensional space based on said Fundamental Matrix;
    aligning the triangulated points to a target model; and
    generating texture for use on the aligned points to generate a first in game model at runtime.

2. The computer-implemented method of claim 1, further comprising:
    compressing the generated texture; and
    uploading the compressed texture to a game server via a data processor.

3. The computer-implemented method of claim 1, further comprising solving for a set of morph shapes on the target model based at least in part on said set of images.

4. The computer-implemented method of claim 1, wherein said isolating one or more features includes limiting an area of each image of the set of images to a face tracking rectangle.

5. The computer-implemented method of claim 1, further comprising eliminating said matched features that are outliers via a parameter estimation.

6. The computer-implemented method of claim 1, wherein said triangulating points further comprises a minimization selected from at least one of a bundle adjustment and a damped least-squares.

7. The computer-implemented method of claim 1, wherein said aligning the triangulated points further comprises at least one of rotating, scaling, translating, transforming, and sweeping the triangulated points to the target model.

8. The computer-implemented method of claim 1, wherein said generating texture further comprises blending said generated texture onto a preset head texture.

9. The computer-implemented method of claim 1, wherein said isolating one or more features comprises defining features based on at least one of a Scale Invariant Feature Transform, a Speeded Up Robust Features, a Binary Robust Invariant Scalable Keypoints, a Fast Retina Keypoint, an Accelerated KAZE, a Gradient Location and Orientation Histogram, and a Histogram of Oriented Gradients.

10. A system for capturing a user's likeness on an in game model at runtime based on a set of images of the user, comprising:
    a database for maintaining the set of images of the user;
    a platform being coupled to said database that executes a set of instructions stored on a non-transitory computer readable medium on the platform and executable by a data processor to cause the data processor to perform operations comprising:
        isolating one or more features from the set of images to be matched, wherein each feature represents a group of pixels that can be found across at least one of the set of images;
        matching a selected feature to said one or more isolated features;

triangulating points of the set of images in a three-dimensional space based on said matched features;

aligning the triangulated points to a target model;

generating texture for use on the aligned points to generate a first in game model at runtime; and post-processing the aligned points on the first in game model.

11. The system of claim 10, wherein said set of instructions further comprise instructions for:

compressing the generated texture; and uploading the compressed texture to a game server in communication with the data processor.

12. The system of claim 10, wherein said set of instructions further comprise instructions for solving for a set of morph shapes on the target model based at least in part on said set of images.

13. The system of claim 10, wherein said platform is at least one of a dedicated game console, a biometrics system, a motion picture system, a medical application system, and a multimedia platform.

14. The system of claim 10, wherein said set of instructions further comprise instructions for eliminating said matched features that are outliers via a parameter estimation.

15. The system of claim 10, wherein said triangulating points further comprises a minimization selected from at least one of a bundle adjustment and a damped least-squares.

16. The system of claim 10, wherein said aligning the triangulated points further comprises at least one of rotating, scaling, translating, transforming, and sweeping the triangulated points to the target model.

17. The system of claim 10, wherein said generating texture further comprises blending said generated texture onto a preset head texture.

18. The system of claim 10, wherein said isolating one or more features comprises defining features based on at least one of a Scale Invariant Feature Transform, a Speeded Up Robust Features, a Binary Robust Invariant Scalable Keypoints, a Fast Retina Keypoint, an Accelerated KAZE, a Gradient Location and Orientation Histogram, and a Histogram of Oriented Gradients.

19. A computer-implemented method for capturing a user's likeness on an in game model at runtime based on a set of images of the user, comprising:

isolating one or more features from the set of images based on computer vision feature detection to obtain at least one feature descriptor, wherein a selected feature of a selected feature descriptor represents a group of pixels that can be found across at least one of the set of images;

matching a first feature of a selected image to said one or more isolated features to generate a Fundamental Matrix for each image pair in the set of images;

triangulating points of the set of images in a three-dimensional space based on the matched features and the Fundamental Matrix;

aligning the triangulated points to a target model based on at least one of robust alignment, coarse alignment, and an Iterative Closest Point translation; and generating texture for use on the aligned points to generate a first in game model at runtime.

* * * * *